Nov. 2, 1926.  1,605,812
W. K. DAVIDSON ET AL
LUBRICATOR
Filed Oct. 31, 1924
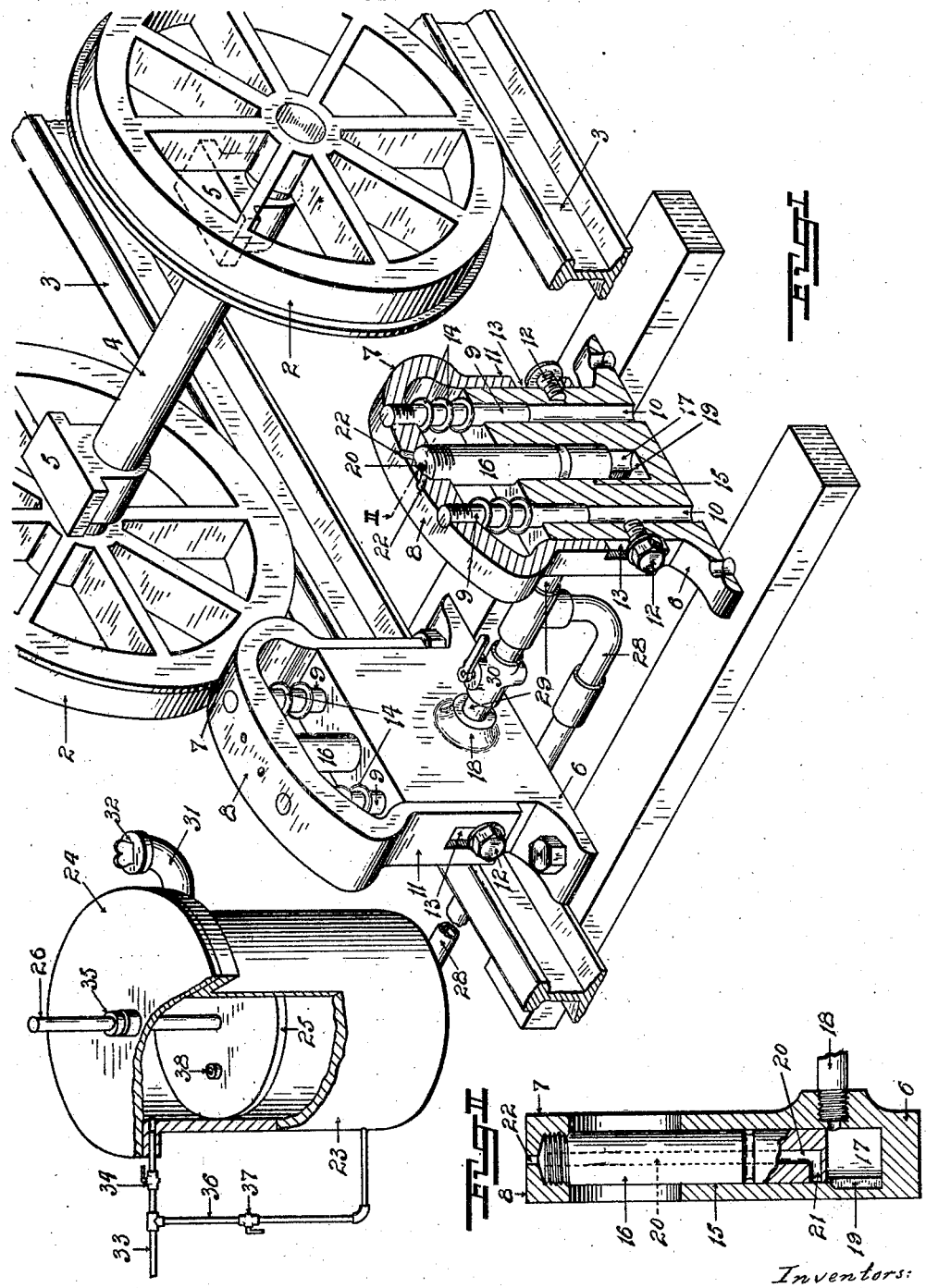
Inventors:
William Kennedy Davidson
and George Smith Muir
By their Attorney.

Patented Nov. 2, 1926.

1,605,812

UNITED STATES PATENT OFFICE.

WILLIAM KENNEDY DAVIDSON AND GEORGE SMITH MUIR, OF KRUGERSDORP, TRANSVAAL, SOUTH AFRICA.

LUBRICATOR.

Application filed October 31, 1924, Serial No. 747,038, and in South Africa June 12, 1924.

The present invention relates to lubricators; the object being to provide an automatic lubricator, of the kind having a reciprocating pump plunger operated by movement of the machinery to be lubricated, which is of simple construction and operates effectively with thick lubricant.

In the accompanying drawing—

Fig. I shows the apparatus applied to the lubrication of truck axles.

Fig. II is a vertical section on II, II Fig. I.

2 indicates the wheels of a truck running on a rail track 3. The wheels are mounted on an axle 4 carried in bearings 5.

A lubricator pedestal 6 is mounted on the track sleepers near to each rail. A ramp 7 having a curved upper surface 8 is mounted on each pedestal so as to be capable of limited vertical movement. It may for instance be provided with guide rods 9 which slide in vertical holes 10 in the block; its ends 11 sliding on the end faces of the pedestal and being restrained by bolts 12 passing through elongated slots 13 therein. Springs 14 or other suitable devices hold the ramp yieldingly in its uppermost position.

In the block 6 is bored a cylinder 15 in which works a plunger 16 fixed to the ramp. When the ramp is raised as shown, the plunger leaves a space 17 in the cylinder beneath it into which grease or thick oil is forced under pressure through the inlet 18.

In the side of the chamber is cut a by-pass passage 19; and in the plunger is a longitudinal passage 20 opening onto the side of the plunger at 21. The upper end of the passage 20 connects with holes 22 for conveying the lubricant to the surface of the ramp.

At a suitable position near to the track is arranged a lubricant containing cylinder 23 fitted with a removable cover 24. A piston 25 works in the cylinder and is provided with a stem 26 which passes through the cover 24, serving as a guide to hold the piston 25 in position in the cylinder and as a means for manually operating the piston. Pipes 28, 29 connect the lower end of the cylinder to the inlets 18, the pipes 29 being if desired fitted with cocks 30 whereby either or both lubricators may be shut off. The cylinder may be charged after removal of the cover 24 or a filling opening 31 fitted with a cap 32 may be provided.

Pressure is applied in any suitable manner to the piston 25 to force the same downwards. For example compressed air may be admitted to the upper end of the cylinder from a pipe 33 controlled by a cock 34, the stem 26 being packed by a stuffing box 35. A branch pipe 36 controlled by a cock 37 enables compressed air to be admitted into the lower end of the cylinder to raise the piston 25. A dead weight or a spring may in some circumstances be more conveniently employed for loading the piston.

In using the apparatus described, the cylinder 23 is charged with grease or thick oil beneath the piston 25 and downward pressure is applied to said piston. The cocks 30 being opened, the lubricant is forced through the pipes 28, 29 into the chamber 17 of each of the lubricators, the ramps 7 being raised.

Upon a truck passing, its axle 4 rides over and depresses the ramp 7 of each of the lubricators. As the plunger 16 is thereby depressed it closes the inlet 18. The by-pass 19 and lateral opening 21 are so disposed, that as the inlet 18 is being closed, the opening 21 comes into the by-pass whereby lubricant displaced from the chamber 17 by the descent of the plunger is forced around the by-pass through the opening 21, the longitudinal passage 20, and the holes 22, and deposited on the surface 8 of the ramp, from which it is picked up by the axle.

When the truck passes on, the springs 14 raise the ramp and the plunger, so leaving a vacuuous space in the chamber 17. The space is filled, upon the plunger regaining its upper position, by fresh grease from the pipe 29. The grease in said pipe being delivered under pressure flows into the vacuuous space more readily than the grease in the passages in the plunger, which, owing to its viscosity does not flow readily except when under considerable pressure.

The cylinder 22 is of sufficient capacity to keep the lubricators supplied for long periods. When it is empty (as is indicated by the position of the stem 26) the cock 34 is closed and the cock 37 is opened to raise the piston 25. The air being then shut off, a fresh charge of grease is fed to the cylinder 23 which is then closed and the load again applied to the piston. 38 is a downwardly opening non-return valve which facilitates the raising of the piston 25 by hand.

We claim:

1. In a lubricator, a cylinder, a lubricant reservoir, a lubricant conveying connection from the reservoir to the cylinder, a piston in the reservoir, means to apply pressure constantly to the piston causing the same to force lubricant from the reservoir to the cylinder, a plunger reciprocable in the cylinder, the lubricant conveying connection entering the cylinder at a point to be covered and thereby shut off directly by the plunger in moving longitudinally, and a valveless outlet passage for lubricant arranged to be uncovered and thereby opened directly by the piston in moving longitudinally, as the inlet passage is closed.

2. A truck axle lubricator comprising a resiliently depressible ramp, means guiding the ramp for vertical movement without rotation, a pump plunger fixed to the ramp, a fixed pump cylinder in which the plunger reciprocates, a lubricant reservoir having means for constantly applying pressure to the lubricant therein tending to expel the lubricant from the reservoir, a valveless inlet connection from the reservoir to the cylinder and a valveless outlet from the cylinder, said inlet and outlet being covered and uncovered directly by the plunger and thereby closed and opened.

3. The combination of a reservoirless truck axle lubricator positioned on a rail track and comprising a depressible ramp, and a pump actuated by the ramp to force lubricant to the surface thereof, a lubricant reservoir at the side of the track and eccessible without stopping traffic on the track, a pipe connection from the reservoir to the pump and means in connection with the reservoir constantly tending to express lubricant therefrom through the pipe to feed the pump.

In testimony whereof we affix our signatures.

WILLIAM KENNEDY DAVIDSON.
GEORGE SMITH MUIR.